(12) United States Patent
Koike

(10) Patent No.: US 7,292,915 B2
(45) Date of Patent: Nov. 6, 2007

(54) VEHICLE CONTROL DEVICE

(75) Inventor: Naoki Koike, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 467 days.

(21) Appl. No.: 11/052,303

(22) Filed: Feb. 8, 2005

(65) Prior Publication Data

US 2005/0273214 A1   Dec. 8, 2005

(30) Foreign Application Priority Data

Jun. 3, 2004   (JP) ............................. 2004-166100

(51) Int. Cl.
*G06F 17/00* (2006.01)

(52) U.S. Cl. ............................. 701/1; 701/29; 340/442

(58) Field of Classification Search .................... 701/1, 701/29, 36, 86, 87, 95; 340/442–445; 73/146, 73/146.5
See application file for complete search history.

(56) References Cited

U.S. PATENT DOCUMENTS

| | | | | |
|---|---|---|---|---|
| 5,569,848 A | * | 10/1996 | Sharp | 73/146.2 |
| 5,629,478 A | * | 5/1997 | Nakajima et al. | 73/146.2 |
| 5,670,716 A | * | 9/1997 | Tamasho et al. | 73/146.2 |
| 6,064,931 A | * | 5/2000 | Sawada et al. | 701/41 |
| 6,604,026 B2 | * | 8/2003 | Schmitt | 701/1 |
| 7,117,074 B2 | * | 10/2006 | Sugisawa | 701/29 |
| 2007/0139179 A1 | * | 6/2007 | Yanase | 340/443 |

FOREIGN PATENT DOCUMENTS

| | | |
|---|---|---|
| JP | 2001-80436 A | 3/2001 |
| JP | 2002-317679 A | 10/2002 |
| JP | 2003-25816 A | 1/2003 |
| JP | 2003-220962 A | 8/2003 |

* cited by examiner

*Primary Examiner*—Gary Chin
(74) *Attorney, Agent, or Firm*—Sughrue Mion Pllc.

(57) ABSTRACT

A vehicle control device having a tire air pressure detecting unit for detecting tire air pressure of a vehicle having an engine mounted in the vehicle and outputting a tire air pressure signal, a tire air pressure reduction judging unit for judging on the basis of the tire air pressure signal whether the tire air pressure is reduced to predetermined pressure or less, and an output varying unit for varying driving force of the engine to tires according to a predetermined varying function on the basis of the judgment result. Even if a driver does not perceive an alarm when reduction of tire air pressure is detected, a driving system such as an engine, a transmission and a clutch is controlled according to a predetermined varying function. Therefore, for example, the rotational speed of the engine is periodically varied, and thus the driver has an uncomfortable feeling. Therefore, the driver can surely recognize the reduction of the tire pressure.

13 Claims, 16 Drawing Sheets

TIME VARIATION EXAMPLE OF OFFSET AMOUNT: a (ONE PERIOD)

TIME VARIATION EXAMPLE OF FUEL INJECTION AMOUNT (ONE PERIOD)

TIME VARIATION EXAMPLE OF OFFSET AMOUNT:
b (THREE PERIODS)

TIME VARIATION EXAMPLE OF COEFFICIENT:
k2 (THREE PERIODS)

TIME VARIATION EXAMPLE OF COEFFICIENT:
k1 (ONE PERIOD)

TIME VARIATION EXAMPLE OF OFFSET AMOUNT: a (ONE PERIOD)

TIME VARIATION EXAMPLE OF FUEL INJECTION AMOUNT (ONE PERIOD)

TIME VARIATION EXAMPLE OF OFFSET AMOUNT: b (THREE PERIODS)

TIME VARIATION EXAMPLE OF OFFSET AMOUNT: c (THREE PERIODS)

TIME VARIATION EXAMPLE OF COEFFICIENT:
k1 (THREE PERIODS)

TIME VARIATION EXAMPLE OF OFFSET AMOUNT:
a (THREE PERIODS)

TIME VARIATION EXAMPLE OF FUEL INJECTION AMOUNT (THREE PERIODS)

TIME VARIATION EXAMPLE OF OFFSET AMOUNT: b (ONE PERIOD)

TIME VARIATION EXAMPLE OF OFFSET AMOUNT: c (ONE PERIOD)

VEHICLE CONTROL DEVICE

BACKGROUND OF THE INVENTION

1. Field of the Invention

The present invention relates to a vehicle control device for enabling an driver of a vehicle to surely recognize that air pressure of a tire is reduced to predetermined pressure or less when the air pressure of the tire is reduced to the predetermined pressure or less.

2. Description of the Related Art

When the air pressure of a tire is gradually reduced during traveling of a vehicle, a driver hardly recognizes reduction in air pressure because he/she does not immediately have uncomfortable feeling. However, the reduction in air pressure causes tire burst or the like, and has risky elements such as induction of abnormality in a steering operation at a curve, etc., so that it is necessary to inform the reduction of air pressure to a driver. Accordingly, there has been proposed a vehicle equipped with a tire air pressure alarming device in which the air pressure of a tire (tires) is directly or indirectly measured and an alarm is emitted by some method to inform reduction in tire air pressure to a driver when the tire air pressure thus measured is reduced to predetermined pressure or less.

For example, JP-A-2002-317679 (hereinafter referred to as Patent Document 1) has proposed a method of restricting the speed of a vehicle when tire air pressure is reduced, thereby enhancing safety of the vehicle.

Furthermore, there has been developed run flat tires with which a vehicle can travel by a predetermined distance if the vehicle speed is equal to a predetermined speed or less even when the tire blows out.

Still furthermore, when the air pressure of a tire at one side of a vehicle is reduced, a driver has an uncomfortable feeling. From this viewpoint, JP-A-2003-220962 (hereinafter referred to as Patent Document 2) has proposed a technique of preventing a driver to have an uncomfortable feeling by changing control characteristics of power steering and vehicle stability control.

Still furthermore, JP-A-2001-80436 (hereinafter referred to as Patent Document 3) has proposed a method of mounting a fluid-filled deformable container of rubber or the like on a site coming into contact with a driver such as a steering wheel and varying the state of the fluid to change a sense of touch when the tire air pressure is reduced, thereby making the driver recognize the reduction in the tire air pressure.

Furthermore, JP-A-2003-25816 (hereinafter referred to as Patent Document 4) has proposed a method of giving minute vibration to a steering system of a lane keep system for making the travel locus of a vehicle follow a target locus through automatic steering control when tire air pressure is reduced, by using an actuator equipped in the steering system, thereby making a driver have a uncomfortable feeling and thus recognize the reduction in tire air pressure.

Even when a tire blows out and an alarm is emitted by a buzzer (alarm sound), there is a probability that a driver cannot perceive the alarm emitted from the buzzer if he/she listens to music or has a conversation with another driver while a vehicle travels. Furthermore, even when an alarm is displayed with a character indication, the driver may pass over the alarm display.

Furthermore, there is a risk that the driver cannot recognize what the alarm means even when the driver perceives or sees the display because blowout of a tire is rare.

The method of restricting the vehicle speed has a problem that a driver does not perceive blowout of a tire with high probability when the vehicle travels at a restricted speed or less.

Furthermore, according to the method using run flat tires, the driver hardly perceives the blowout because the vehicle can travel at a predetermined vehicle speed or less by a predetermined distance after the blowout. Even when the driver perceives the blowout, he/she may continue to drive at a speed exceeding the predetermined speed by a distance exceeding the predetermined distance because he/she is overconfident to the performance of the run flat tires. If the driver does not make any adjustment even when tire air pressure is reduced or the driver does not exchange a blowout tire by a new tire, the control characteristic of the vehicle is varied and thus stability may be lost. Furthermore, the same risk may occur when the vehicle is used under conditions exceeding a predetermined speed and a predetermined distance which are prescribed in the specification of the run flat tires.

In the case of the technique of preventing a driver from having a uncomfortable feeling when a tire blows out, the driver is more and more forgetting to recognize necessity of exchanging a blowout tire, and thus there is a risk that the driver continues to drive the vehicle.

On the other hand, the method of making a driver uncomfortable when tire air pressure is reduced, and thus making the driver recognize the reduction of the tire air pressure has a problem that a device for applying a minute vibration to a steering is newly required and thus the cost is increased.

As described above, all the prior arts have some problems, and there has not been achieved any satisfiable technique.

SUMMARY OF THE INVENTION

The invention has been implemented in view of the foregoing problems, and has an object to provide an inexpensive vehicle control device which makes drivers of a vehicle have uncomfortable feeling when air pressure of a tire is reduced to predetermined pressure or less, whereby the drivers can surely recognize that a vehicle is in abnormal condition.

In order to attain the above object, according to the invention, there is provided a vehicle control device comprising a tire air pressure detecting unit for detecting air pressure of each tire equipped on a vehicle having an engine (in the invention, the engine is more broadly defined so as to contain an internal combustion engine, an electrical ignition spark type engine, an electrical motor, etc.) mounted therein and outputting a tire air pressure signal representing the tire air pressure thus detected, a tire air pressure reduction judging unit for judging on the basis of the tire air pressure signal whether the tire air pressure is reduced to predetermined pressure or less, and an output varying unit for varying driving force of the engine to the tire according to a predetermined variation function on the basis of the judgment of the tire air pressure reduction judging unit.

According to the vehicle control device of the invention, even if a driver does not perceive an alarm when the reduction of the tire air pressure is detected, a driving system containing an engine, a transmission, a clutch, etc. is controlled according to the predetermined variation function, whereby drivers are made to have uncomfortable feeling by periodically varying the rotational speed of the engine for example, so that the drivers can surely recognize the reduction of the tire air pressure.

DETAILED DESCRIPTION OF THE PREFERRED EMBODIMENTS

Preferred embodiments according to the invention will be described with reference to the accompanying drawings.

Figure 1:
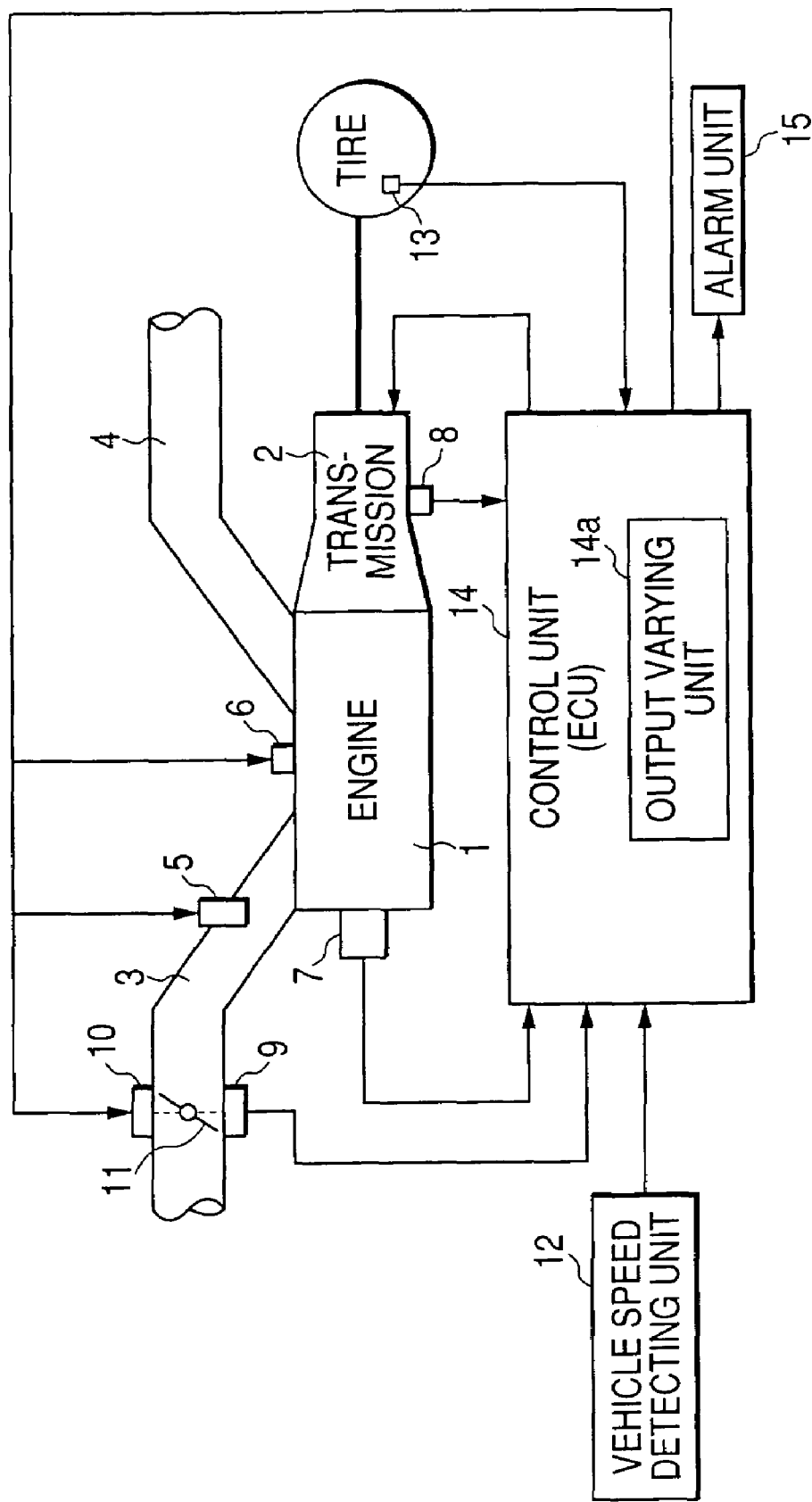
FIG. 1 is a diagram showing the construction of a vehicle control device according to the invention.

FIG. 1 is a diagram showing the construction of a vehicle control device according to a first embodiment of the invention.

In FIG. 1, a transmission 2 is mounted in a spark ignition type engine 1 mounted in a vehicle or the like. The engine 1 sucks air through an air suction pipe 3, and discharges exhaust gas through an exhaust pipe 4. Furthermore, fuel is supplied from a fuel supplying unit (injector) 5 to the engine 1, and ignition is carried out by an ignition unit (ignition coil, ignition plug, etc.) 6. An engine parameter detecting unit 7 containing a crank angle sensor, a water temperature sensor, etc. are provided, and also a transmission parameter detecting unit 8 containing a rotational speed sensor for detecting an input rotational speed and an output rotational speed of the transmission 2, an oil temperature sensor, etc. is further provided.

A throttle valve 11 is equipped with a throttle valve opening degree detecting unit (throttle position sensor) 9, and it is opened/closed under the control of a throttle actuator 10. However, the throttle valve 11 may be directly controlled through a wire (not shown) by an accelerator pedal (not shown) without using the throttle actuator 10. A vehicle speed detecting unit 12 detects the speed of a vehicle (which is proportional to a tire rotational speed or the like).

A tire air pressure detecting unit 13 detects the air pressure of a tire (tires). Detection signals of the respective detecting units described above and signals to the respective control units are input/output to/from a control unit (ECU) 14. The control unit 14 calculates a fuel injection amount, etc. on the basis of various parameter signals such as an engine rotational speed, and controls the engine 1, the transmission 2, etc. When the tire air pressure is reduced to a value less than predetermined pressure, an alarm unit 15 notifies abnormality to a driver with a lamp, a buzzer or the like, and also an output varying unit 14a equipped in the control unit 14 makes drivers recognize the reduction in tire air pressure by carrying out the control of the embodiments described below.

In the respective embodiments described below, the type of the transmission 2 is not limited to a specific type, and for example, it may be a manual transmission type or an automatic transmission type. Furthermore, the automatic transmission type is not limited to a specific one, and for example, it may be a step type or CVT type. The throttle valve 11 may be physically directly linked to the accelerator pedal through a cable without controlling the opening/closing operation of the throttle valve 11 by the throttle actuator 10. In the following description, some of the following embodiments may be effective to only specific types, and thus in such a case, an applicable type will be specified case by case.

First Embodiment

Figure 2:
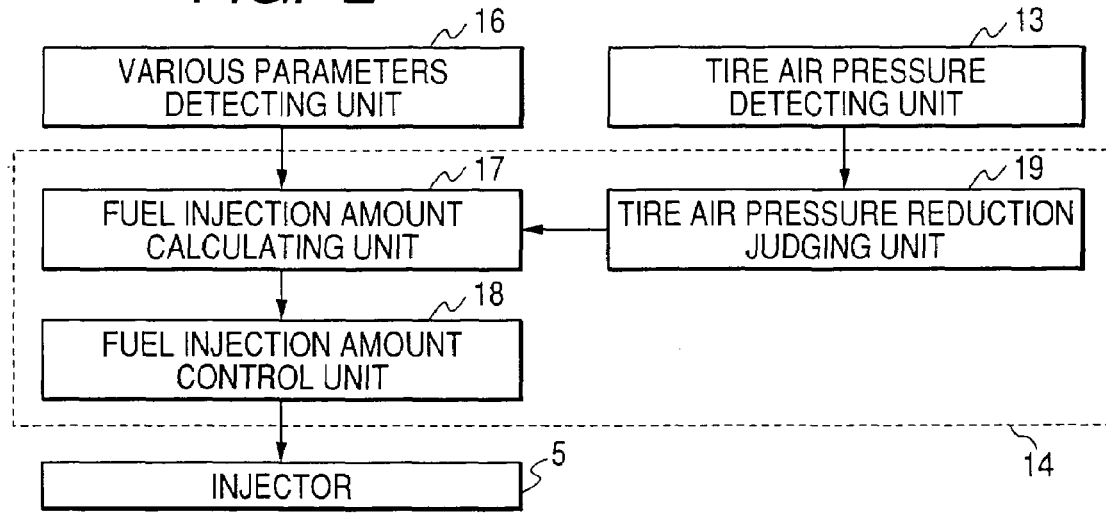
FIG. 2 is a block diagram showing a first embodiment.

FIG. 2 is a block diagram showing the operation of a vehicle control device according to a first embodiment of the invention.

The vehicle control device of FIG. 2 is equipped with a various-parameters detecting unit 16 for receiving signals from various sensors such as the engine rotational speed sensor and the water temperature sensor, detecting the statuses of the engine and the transmission and inputting the detected signals to the control unit 14, the tire air pressure detecting unit 13 for detecting the tire air pressure, a control unit 14 for receiving the signals from the various-parameters detecting unit 16, the tire air pressure detecting unit 13, etc. and carrying out various judgments and processing on the basis of the signals thus received to control the fuel injection amount, and an injector 5 which is controlled according to the fuel injection amount thus calculated.

The control unit 14 stores therein a permissible lowest level for the predetermined tire air pressure (which is different in accordance with the specification of tires, etc.), and is equipped with a tire air pressure reduction judging unit 19 for receiving a tire air pressure signal from the tire air pressure detecting unit 13 and judging whether the tire air pressure is reduced to predetermined pressure or less, a fuel injection amount calculating unit 17 for determining a control level of the fuel injection amount on the basis of various status signals from the various-parameters detecting unit 16 and the judgment result of the tire air pressure reduction judging unit 19, and a fuel injection amount control unit 18 for controlling the injector 5 in accordance with the fuel injection amount calculated by the fuel injection amount calculating unit 17. The fuel injection amount calculating unit 17 and the fuel injection amount control unit 18 correspond to the output varying unit 14a of the invention, and it is also called as a fuel-air ratio control unit.

As the tire air pressure detecting unit 13 may be used any one of means of directly detecting tire air pressure by using an air pressure sensor installed in a wheel or the like (well known) and means of indirectly detecting the air pressure of a tire on the basis of variation of the outer diameter of the tire or the like by using a wheel speed sensor used for ABS or the like (well known).

An example of the fuel injection amount calculation equation based on the variation of the tire air pressure is represented by the following equation (1):

$$\text{(fuel injection amount)} = k1 \times \text{(fuel injection amount under normal state)} + a \quad (1)$$

Here, $k1$ represents a multiplication coefficient to the fuel injection amount under normal state, and $a$ represents an offset amount to the fuel injection amount under normal state.

Figure 3:
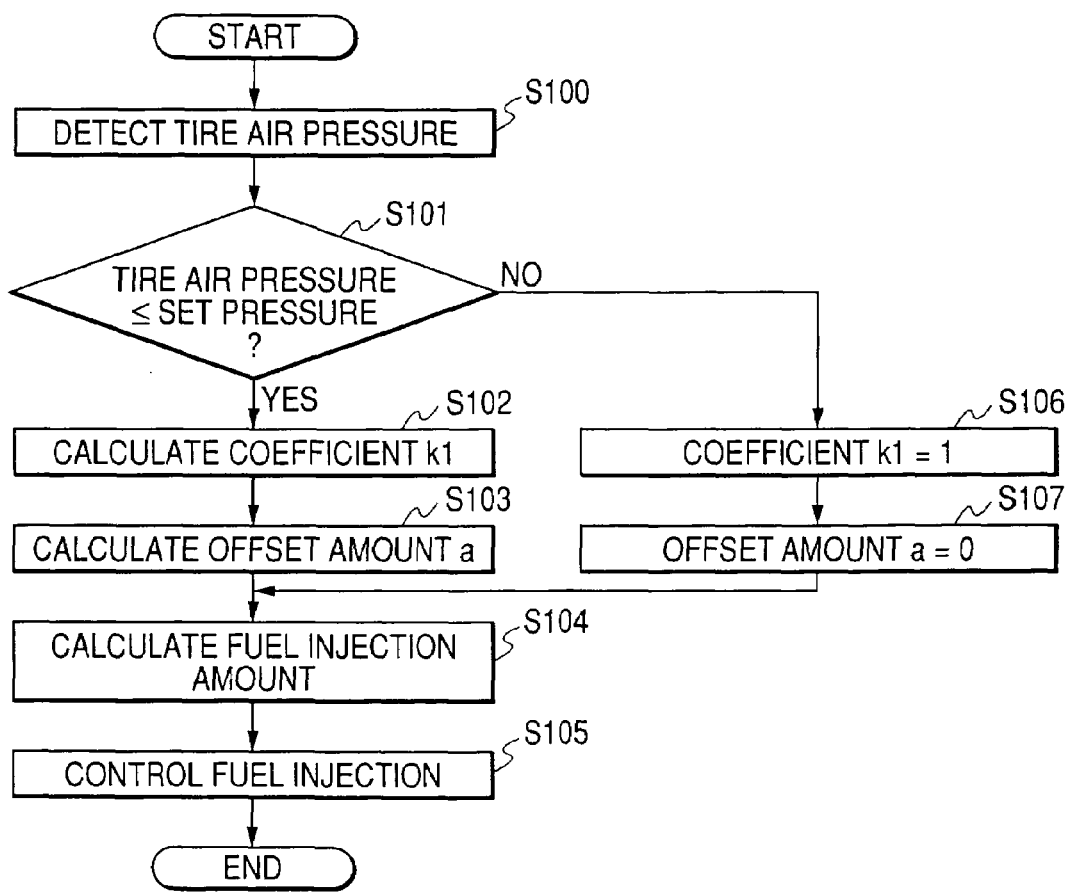
FIG. 3 is a flowchart showing the operation of the vehicle control device of FIG. 2.

The operation of the vehicle control device shown in the block diagram of FIG. 2 will be described with reference to the flowcharts of FIGS. 3 and 4. The same step numbers in the flowcharts of the respective embodiments represent the same operations. Therefore, when the detailed description thereof is duplicated, the description may be omitted. In step S100 of FIG. 3, the tire air pressure detecting unit 13 detects the air pressure of each tire, and the tire air pressure reduction judging unit 19 receives the detection value of the tire air pressure. The detection of the tire air pressure may be carried out every fixed time interval, or irregularly carried out every time an engine is started or in accordance with a vehicle speed. If the preceding tire air pressure detection value is near to a predetermined level, the detection period may be freely shortened.

In the next step S101, the tire air pressure reduction judging unit 19 judges whether the tire air pressure is reduced to predetermined pressure or less. Here, if it is judged that the tire air pressure is over the predetermined pressure and thus it is not reduced to the predetermined pressure or less, the coefficient k1 is set to 1 in step S106, an offset amount a is set to zero in the next step S107 and then the processing goes to a fuel injection amount calculating step S104. That is, a normal fuel injection amount control operation is carried out.

Figure 5:
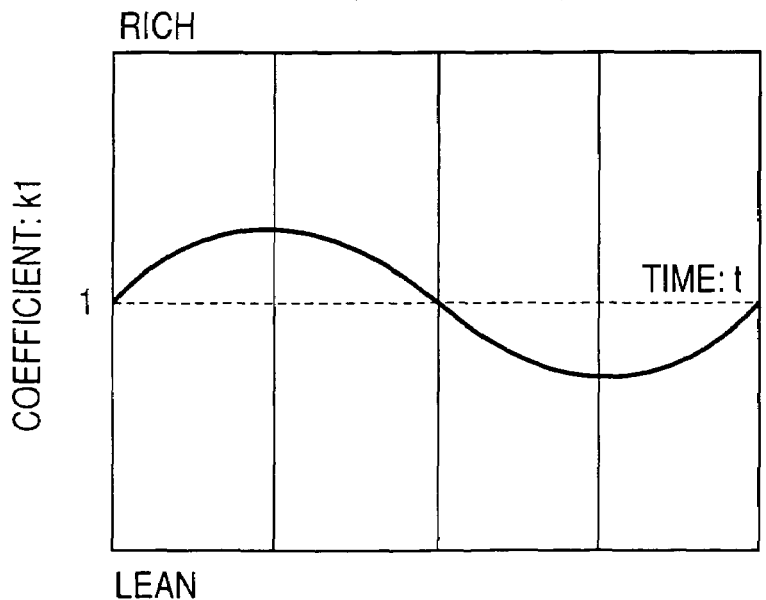
FIG. 5 is a graph showing a time variation example of a fuel injection amount coefficient k1 of FIG. 3.
Figure 6:
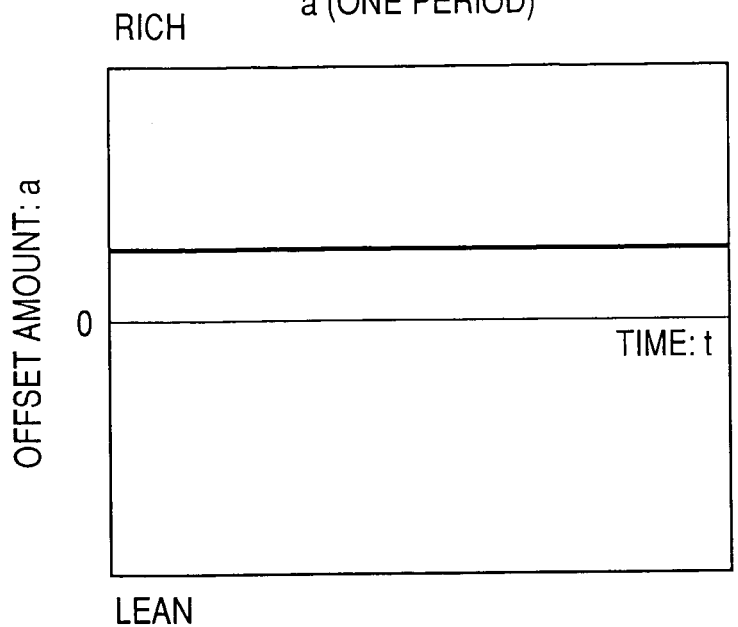
FIG. 6 is a graph showing a time variation example of an offset "a" of the fuel injection amount of FIG. 3.

On the other hand, if it is judged that the tire air pressure is reduced to the predetermined pressure or less, the coefficient k1 is calculated in step S102, the offset amount "a" is calculated in step S103, and then the processing goes to step S104. Here, an example of the coefficient k1 is shown in FIG. 5, and an example of the offset amount "a" is shown in FIG. 6. It is shown from FIG. 5 that the coefficient k1 varies time-dependently with the variation center being set to 1 like a sine wave, and it is also shown from FIG. 6 that the offset amount "a" is a fixed amount. It is preferable that the sine wave has a period of about 0.1 Hz to 10 Hz at which the driver can easily perceive it as variation of the rotational speed of the engine or an output variation. For the same reason, the amplitude of the sine wave is preferably set so that variation of the rotational speed from several tens to several hundred revolutions occurs in the engine, for example. The same is satisfied to the offset amount. However, the offset amount may be set to any value in such a range that variation of the rotational speed from zero to ± several hundred revolutions occurs in the engine, and it is not necessarily set to a fixed value.

In step S104, the fuel injection amount is determined by using the multiplication coefficient k1 and the offset amount a thus calculated, and the injector 5 is controlled in the next step S105 to carry out fuel injection. The above steps are repetitively carried out (the same is applied in the flowcharts of the embodiments described below).

Figure 4:
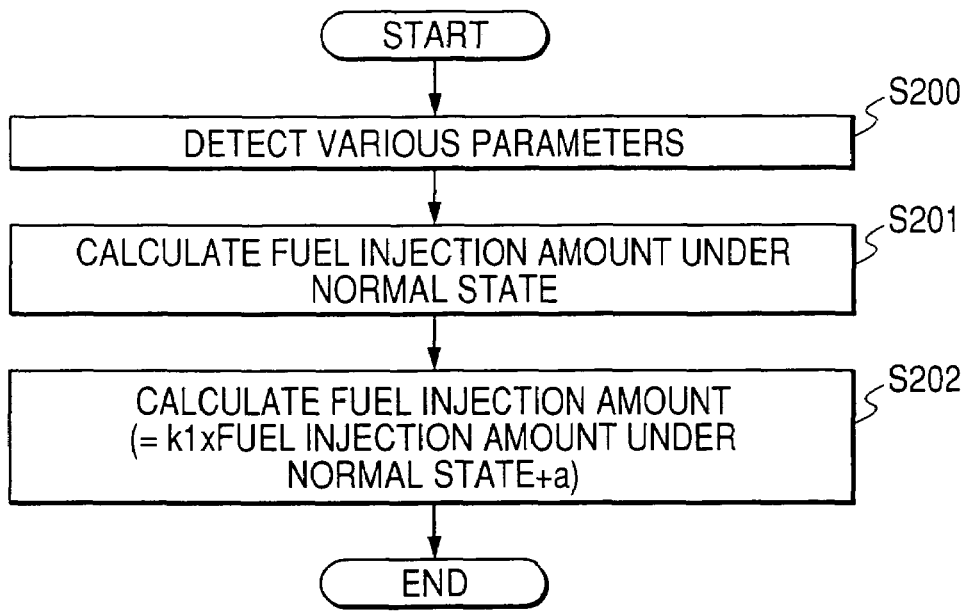
FIG. 4 is a flowchart showing the details of a part of the flow of FIG. 3.

FIG. 4 is a flowchart showing the details of the fuel injection amount calculating step S104. First, in step S200, various parameter signals are received from the various-parameters detecting unit 16. Subsequently, in the under-normal-state fuel injection amount calculating step S201, the fuel injection amount under normal state is calculated from these parameters. Subsequently, the fuel injection amount is calculated by using the equation (1) in step S202.

Figure 7:
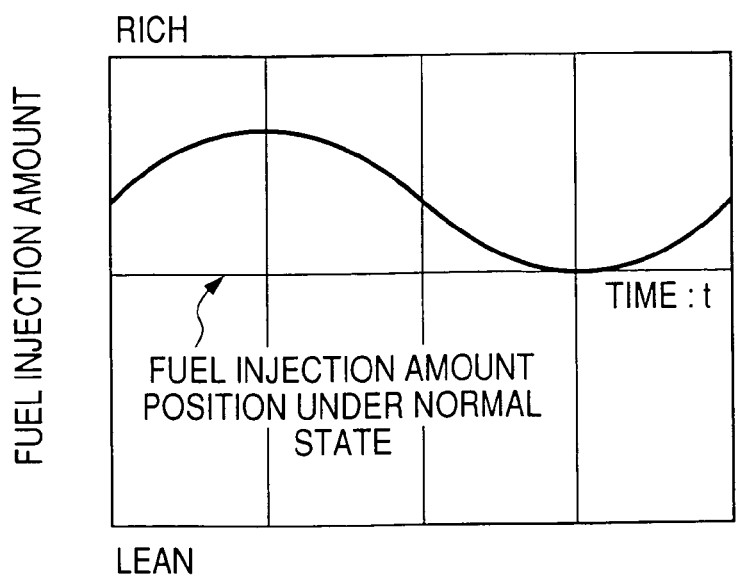
FIG. 7 is a graph showing a time variation example of the fuel injection amount of the first embodiment.

FIG. 7 shows an example of the fuel injection amount achieved by using the equation (1) and FIGS. 5 and 6 when it is judged that the tire air pressure is reduced to the predetermined pressure or less. As is apparent from FIG. 7, the fuel injection amount is shifted to a rich side as a whole, and it increases/decreases time-dependently, so that the air-fuel ratio is increased/reduced, so that the engine output increases/decreases. Accordingly, the driver has such uncomfortable feeling that the engine rotational speed (or torque) increases/decreases although he/she does not operate the accelerator pedal and thus recognizes abnormality. Therefore, the driver perceives that occurrence of such a phenomenon means reduction in tire air pressure because he/she looks through a manual or the like in advance, and thus the driver can drive the vehicle with keeping safety. The control unit of the fuel injection amount corresponds to the air-fuel ratio control unit of the invention.

The alarm unit 15 may display a message indicating the reduction of tire air pressure on a liquid crystal display device (not shown) or the like in the vehicle or inform the message with voices in parallel to the above control operation, thereby informing the reduction of the tire air pressure to a driver who cannot understand why the variation of the rotational speed occurs. Furthermore, the driver who recognizes the reduction of the tire air pressure may return the multiplication coefficient k1 and the offset amount a to the normal levels by pushing an alarm check push button (not shown) in spite of the reduction of the tire air pressure detection value until the engine is next started. Still furthermore, the air-fuel ratio control unit may control the air amount supplied to the engine in place of the control of the fuel injection amount.

Second Embodiment

Figure 8:
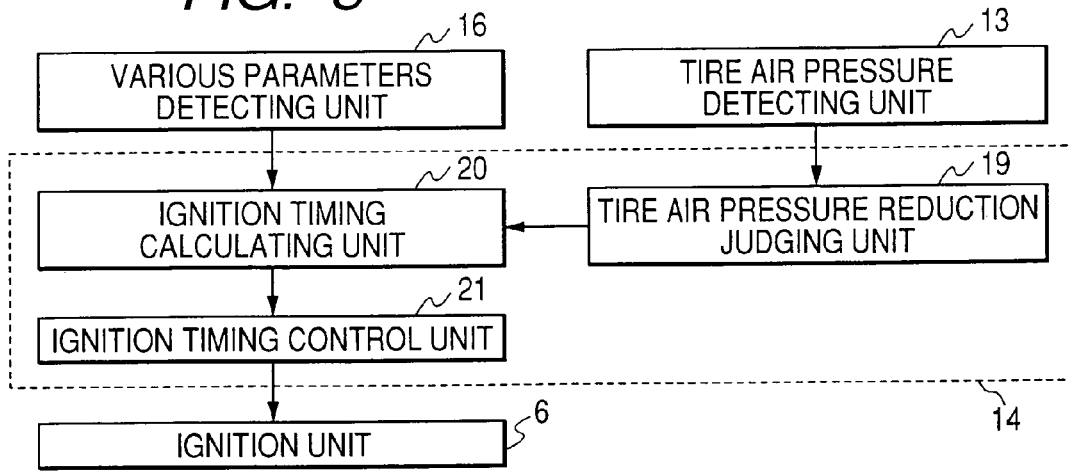
FIG. 8 is a block diagram showing a vehicle control device according to a second embodiment.

FIG. 8 is a block diagram showing a vehicle control device according to a second embodiment. In the description of the second embodiment, a spark ignition type engine is used as the engine 1.

The vehicle control device of this embodiment is equipped with a various-parameters detecting unit 16 for receiving signals from various sensors such as an engine rotational speed sensor and a water temperature sensor and detecting the statuses of the engine and the transmission, a tire air pressure detecting unit 13 for detecting the air pressure of tires, a control unit 14 for receives signals from the various-parameters detecting unit 16, the tire air pressure detecting unit 13, etc. and carrying out various judgments, processing, etc., and an ignition unit 6 such as an ignition coil which is controlled according to an ignition timing determined in the control unit 14.

The control unit 14 is equipped with a tire air pressure reduction judging unit 19 for receiving a tire air pressure signal from the tire air pressure detecting unit 13 and judging whether the tire air pressure is reduced to predetermined pressure or less, an ignition timing calculating unit 20 for determining an ignition timing in accordance with various status signals from the various-parameters detecting unit 16 and the judgment result of the tire air pressure reduction judging unit 19, and an ignition timing control unit 21 for controlling the ignition unit 6 in accordance with the calculation result achieved by the ignition timing calculating unit 20. The ignition timing calculating unit 20 and the ignition timing control unit 21 correspond to the output varying unit 14a of the invention, and the combination of the ignition timing calculating unit 20 and the ignition timing control unit 21 is also called as an ignition timing control unit.

As the tire air pressure detecting unit 13 may be used any one of means of directly detecting the tire air pressure by an air pressure sensor installed in a wheel or the like (well known) and means of indirectly detecting the tire air pressure on the basis of variation of the outer diameter of each tire or the like by using a wheel speed sensor used for ABS or the like (well known).

An example of the ignition timing calculation equation carried out by the ignition timing calculating unit 20 is represented by the following equation (2).

$$\text{(ignition timing)} = \text{(ignition timing under normal state)} + b \quad (2)$$

Here, "b" represents an offset amount to the ignition timing under normal state.

Figure 9:
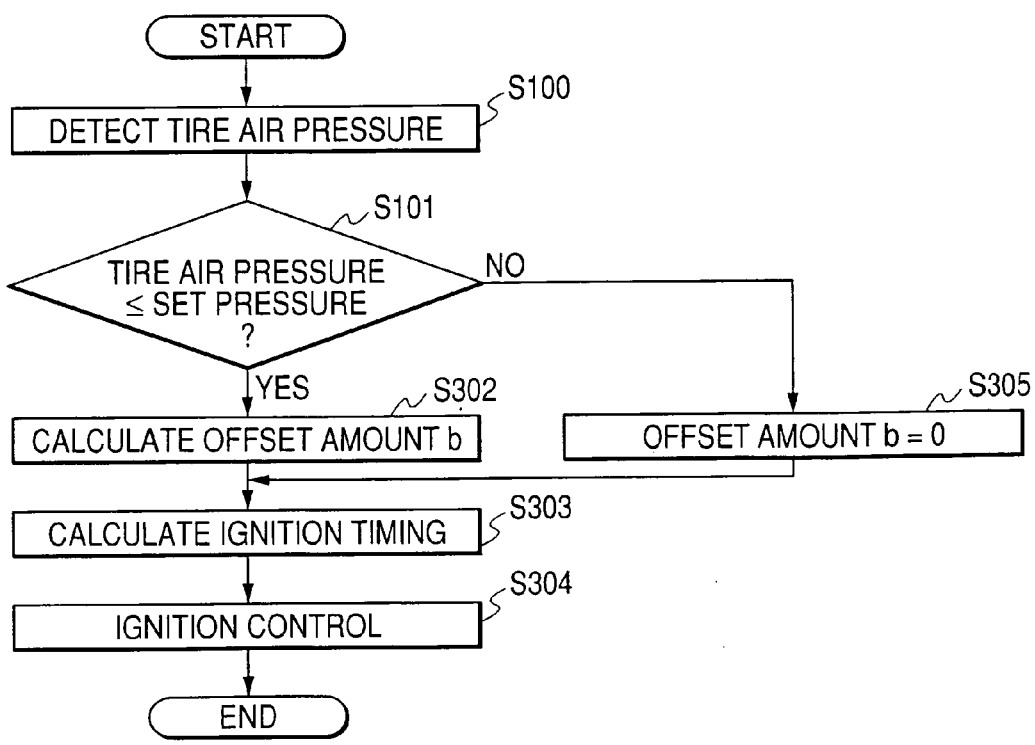
FIG. 9 is a flowchart showing the operation of the vehicle control device of FIG. 8.

The operation of this embodiment will be described with reference to the flowcharts of FIGS. 9 and 10. In step S100 of FIG. 9, the tire air pressure detecting unit 13 receives the detected tire air pressure signal. The detection of the tire air pressure may be carried out every fixed time interval or in accordance with a vehicle status based on a vehicle speed, a previous tire air pressure detection value or the like. In the next step S101, the tire air pressure reduction judging unit 19 judges whether the tire air pressure is reduced to predetermined pressure or less. Here, if it is judged that the tire air pressure is over the predetermined pressure and thus is not reduced to the predetermined pressure or less, the offset amount "b" is set to zero in step S305, and then the processing goes to an ignition timing calculating step S303.

Figure 11:
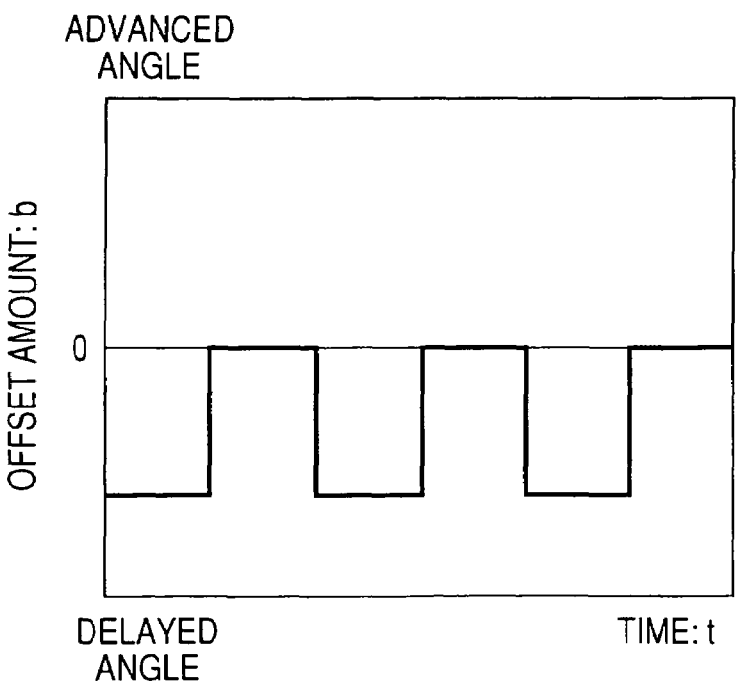
FIG. 11 is a graph showing a time variation example of an ignition timing calculation type offset amount "b" of FIG. 9.

On the other hand, if it is judged that the tire air pressure is reduced to the predetermined pressure or less, the offset amount "b" is calculated in step S302, and then the processing goes to the ignition timing calculating step S303. Here, FIG. 11 shows an example of the offset amount "b". FIG. 11 shows that every predetermined time the offset amount "b" alternately repeats a normal timing state and a state where it is shifted from the normal timing to a delayed angle side by the angle corresponding to a predetermined amount. Since it is the purpose to notify abnormality to the driver by varying the rotational speed of the engine, it is preferable that the variation period is set in the range from several Hz to several tens Hz and the variation amount is set in the range from several degrees to several tens degrees. It is needless to say that they are varied like a sine wave. By using the offset amount "b" thus calculated, the ignition timing is determined in step S303, and the ignition unit 6 is controlled in the next step S304.

Figure 10:
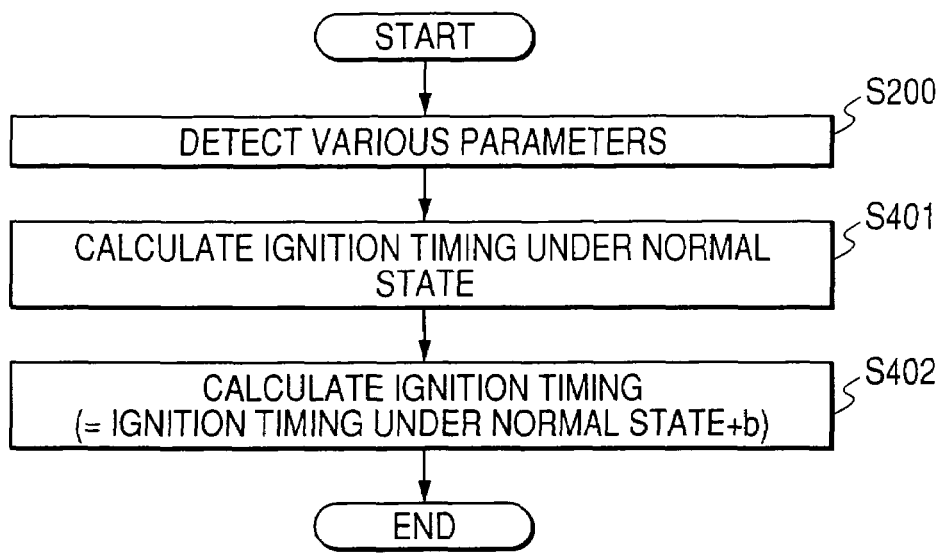
FIG. 10 is a flowchart showing the details of a part of the flow of FIG. 9.

FIG. 10 shows an example of the ignition timing calculating step S303. First, in step S200, various parameter signals are received from the various-parameter detecting unit 16. Subsequently, in the normal-state ignition timing calculating step S401, an ignition timing under normal state is calculated from these parameters. In the next step S402, the ignition timing is determined by using the equation (2).

When it is judged that the tire air pressure is reduced to the predetermined pressure or less, from the equation (2) and FIG. 11, the ignition timing repetitively varies between the ignition timing under normal state and the timing which is delayed in angle from the ignition timing under normal state by a predetermined amount. The ignition timing is shifted to the advanced and delayed sides time-dependently, and thus the engine output increases/decreases. Accordingly, the driver has an uncomfortable feeling and thus recognizes abnormality, so that the driver can drive the vehicle with keeping safety.

Here, the increasing and decreasing function of the fuel injection amount and the variation function of the ignition timing are not limited to the contents of the above embodiments.

Furthermore, the engine control amount is not limited to the fuel injection amount and the ignition timing of the first and second embodiments, and it may be a throttle opening degree control amount based on the throttle actuator. Furthermore, there may be used means of subjecting not only the output control amount as described above, but also various detection parameters such as a suction air amount to increasing/decreasing operation in the control unit 14, so that the engine control amount such as the fuel injection amount is increased/reduced.

The contents described in the first embodiment may be applied as a countermeasure to be taken by the driver after the driver recognizes the reduction of tire air pressure. That is, after pushing the check button, a control unit 14 may set to the ignition timing to the normal ignition timing in spite of the reduction of the tire air pressure.

Third Embodiment

Figure 12:
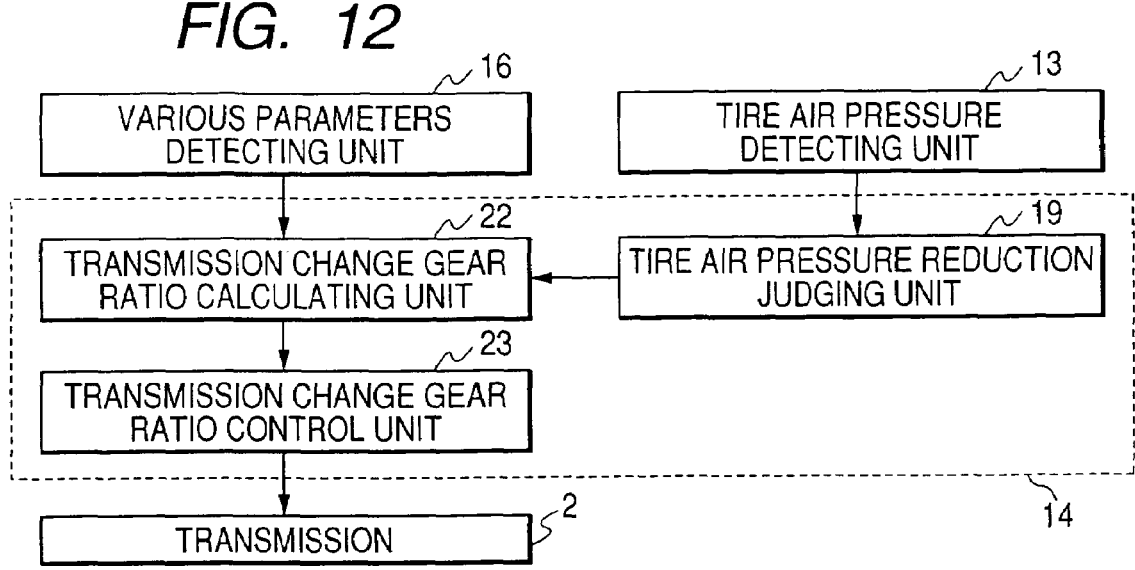
FIG. 12 is a block diagram showing a vehicle control device according to a third embodiment.

FIG. 12 is a block diagram showing a vehicle control device according a third embodiment.

The vehicle control device according to this embodiment is equipped with a various-parameters detecting unit 16 for receiving signals from various sensors such as an engine rotational speed sensor and a water temperature sensor to detect the statuses of the engine, the transmission, etc., a tire air pressure detecting unit 13 for detecting tire air pressure, a control unit 14 for receiving signals from the various-parameters detecting unit 16, the tire air pressure detecting unit 13, etc. and carrying out various judgments, processing, etc., and a transmission 2 which is controlled according to a transmission gear change ratio determined in the control unit 14.

The control unit 14 is equipped with a tire air pressure reduction judging unit 19 for receiving a tire air pressure signal from the tire air pressure detecting unit 13 and judging whether the tire air pressure is reduced to predetermined pressure or less, a transmission change gear ratio calculating unit 22 for calculating a transmission change gear ratio in accordance with various status signals from the various-parameters detecting unit 16 and a judgment result of the tire air pressure reduction judging unit 19, and a transmission change gear ratio control unit 23 for controlling the transmission 2 in accordance with the calculation result achieved by the transmission change gear ratio calculating unit 22. The transmission change gear ratio calculating unit 22 and the transmission change gear ratio control unit 23 correspond to the output varying unit of the invention, and it is called as a change gear ratio control unit.

As the tire air pressure detecting unit 13 may be used any one of means of directly detecting the tire air pressure by using an air pressure sensor installed in a wheel or the like (well known) and means of indirectly detecting the tire air pressure on the basis of variation of a tire outer diameter or the like by using a wheel speed sensor used for ABS or the like (well known).

An example of the change gear ratio calculation equation is represented by the following equation (3).

$$(\text{change gear ratio}) = (\text{change gear ratio under normal state}) + c \quad (3)$$

Here, "C" represents an offset amount to the change gear ratio under normal state (when reduction of tire air pressure is not detected). In the case of a gear selection type, the offset amount may be varied between the one-step increment and the one-step decrement in gear ratio, and in the case of a continuously variable change-gear-ratio type, the offset amount may be varied between the increment of several percentages to several tens percentages and the decrement of several percentages to several tens percentages in change gear ratio.

The operation of this embodiment will be described according to the flowcharts of FIGS. 13 and 14.

Figure 13:
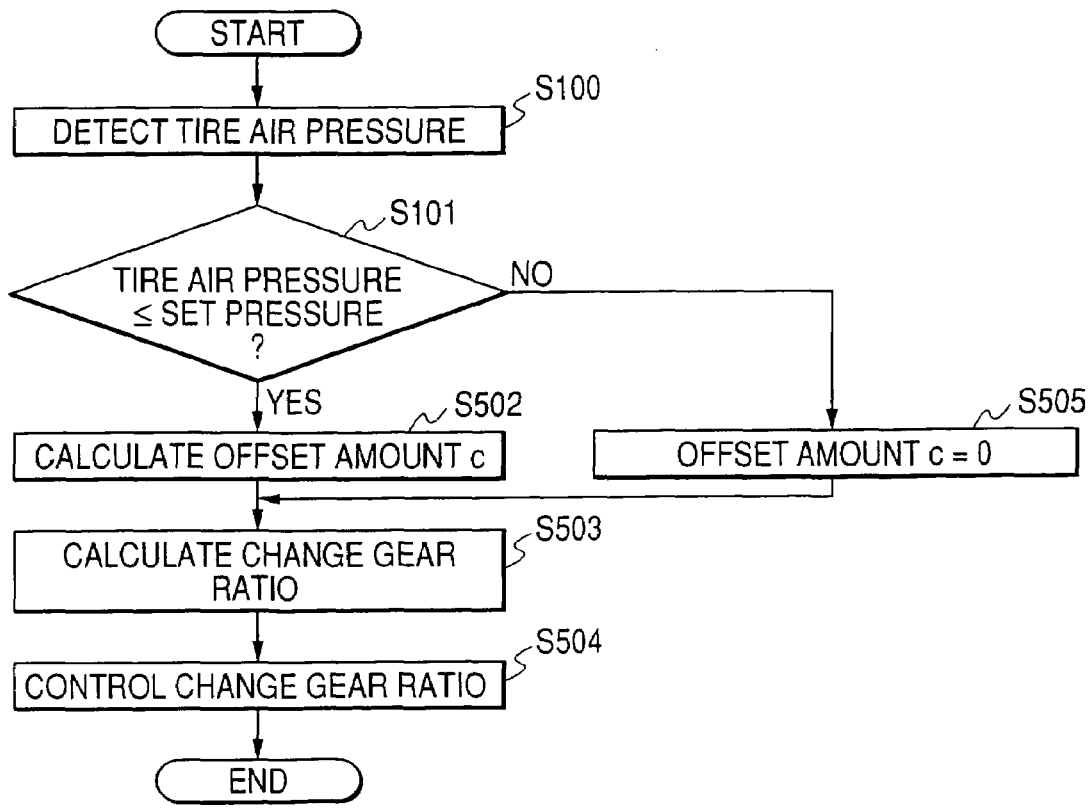
FIG. 13 is a flowchart showing the operation of the vehicle control device of FIG. 12.

In step S100 of FIG. 13, the tire air pressure signal detected by the tire air pressure detecting unit 13 is received. The detection of the tire air pressure may be carried out every fixed time interval or in accordance with a vehicle status such as a vehicle speed and a previous tire air pressure detection value.

In the next step S101, the tire air pressure reduction judging unit 19 judges whether the tire air pressure is reduced to predetermined pressure or less. Here, if it is judged that the tire air pressure is over the predetermined pressure and thus it is not reduced to the predetermined pressure or less, an offset amount "c" is set to zero in step S505, and then the processing goes to a transmission change gear ratio calculating step S503.

Figure 15:
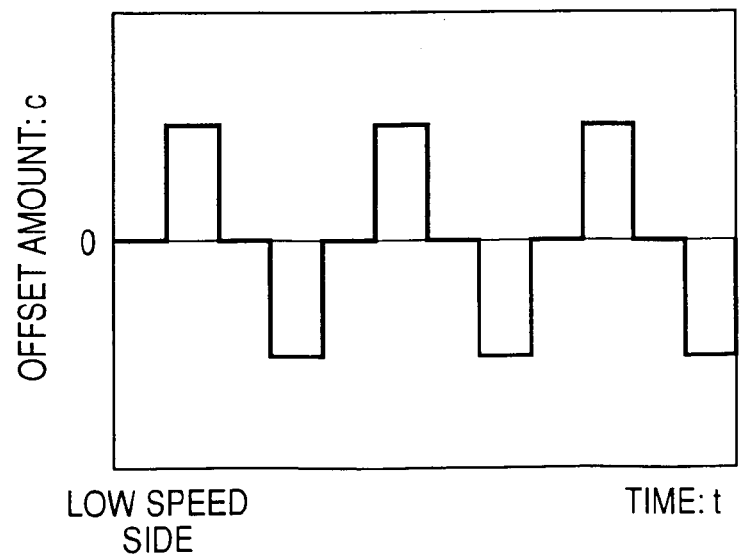
FIG. 15 is a graph showing a time variation example of a change gear ratio calculation type offset amount "c"

On the other hand, if it is judged that the tire air pressure is reduced to the predetermined pressure or less, the offset amount "c" is determined in step S502, and then the processing goes to the transmission change gear ratio calculating step S503. Here, FIG. 15 shows an example of the offset amount "c". FIG. 15 shows that the offset amount "c" repeats a high-speed side offset amount, a normal change gear ratio (c=0) and a low-speed side offset amount every predetermined time.

By using the offset amount "c" thus determined, the transmission change gear ratio is calculated in step S503, and the change gear ratio of the transmission 2 is controlled in the next step S504.

Figure 14:
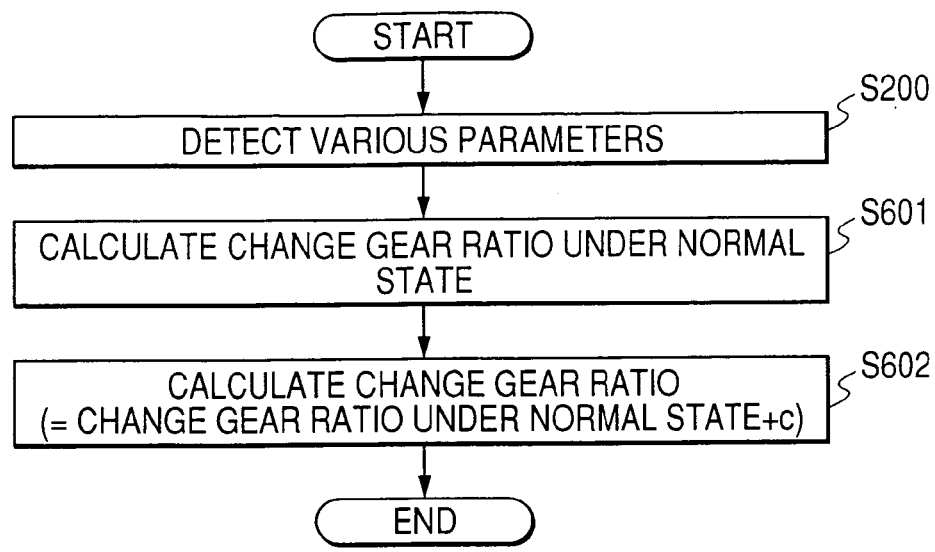
FIG. 14 is a flowchart showing the details of a part of the flow of FIG. 13.

Next, FIG. 14 shows an example of a transmission change gear ratio calculating step S503. First, in step S200, various parameter signals are received from the various-parameters detecting unit 16. Subsequently, in a normal-state change gear ratio calculating step S601, a change gear ratio under normal state is calculated from these parameters. Subsequently, in step S602, the change gear ratio is calculated by using the equation (3).

When it is judged that the tire air pressure is reduced to the predetermined pressure or less, from the equation (3) and FIG. 15, the change gear ratio repeats the state of the higher-speed-side change gear ratio than the change gear ratio under normal state, the change gear ratio under normal state (c=0) and the state of the lower-speed-side change gear ratio than the change gear ratio under normal state every predetermined time (for example, one to several seconds). Since the change gear ratio increases/decreases time-dependently, the engine rotational speed is increased and reduced, and thus the driving force of the vehicle increases/decreases. Accordingly, the driver has an uncomfortable feeling, and thus recognizes abnormality, so that the driver can drive the vehicle with keeping safety.

Here, the increasing and decreasing function of the transmission change gear ratio is not limited to the content of the embodiments described above. The change gear ratio may be repetitively varied between the normal state and only one of the higher-speed state and the lower speed state.

Fourth Embodiment

Figure 16:
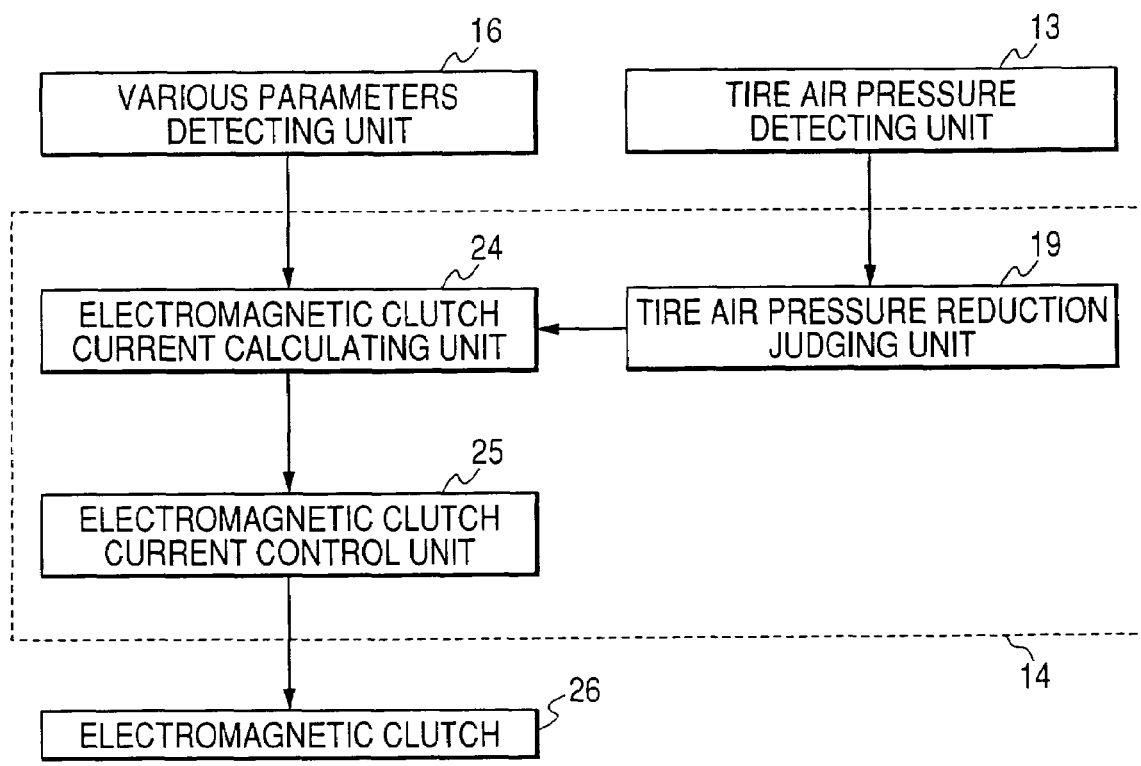
FIG. 16 is a block diagram showing a vehicle control device according to a fourth embodiment.

FIG. 16 is a block diagram showing a vehicle control device according to a fourth embodiment of the invention. In this case, the description will be made on the assumption that the clutch is an electromagnetic clutch.

The vehicle control device of this embodiment is equipped with a various-parameters detecting unit 16 for receiving signals from various sensors such as an engine rotational speed sensor and a water temperature sensor and detecting the statuses of the engine, the transmission, etc., a tire air pressure detecting unit 13 for detecting the tire air pressure, a control unit 14 for receiving various signals from the various-parameters detecting unit 16, the tire air pressure detecting unit 13, etc. and carrying out various judgments, processing, etc., and an electromagnetic clutch 26 which is controlled according to electromagnetic clutch current determined in the control unit 14.

The control unit 14 is equipped with a tire air pressure reduction judging unit 19 for receiving the tire air pressure signal from the tire air pressure detecting unit 13 and judging whether the tire air pressure is reduced to predetermined pressure or less, an electromagnetic clutch current calculating unit 24 for calculating electromagnetic clutch current in accordance with the various status signals from the various-parameters detecting unit 16 and the judgment result of the tire air pressure reduction judging unit 19, and an electromagnetic clutch current control unit 25 for controlling the current of the electromagnetic clutch 26 in accordance with the calculation result achieved by the electromagnetic clutch current calculating unit 24. The electromagnetic clutch current calculating unit 24 and the electromagnetic clutch current control unit 25 correspond to the output varying unit of the invention, and it is also called as a clutch control unit.

As the tire air pressure detecting unit 13 may be used any one of means of directly detecting tire air pressure by using an air pressure sensor installed in a wheel or the like and means of indirectly detecting the air pressure of a tire on the basis of variation of the outer diameter of the tire or the like by using a wheel speed sensor used for ABS or the like.

An example of the electromagnetic clutch current calculating equation is represented by the following equation (4).

$$(\text{electromagnetic clutch current}) = k2 \times (\text{electromagnetic clutch current under normal state}) \quad (4)$$

Here, k2 represents a coefficient to the electromagnetic clutch current under normal state.

The operation of this embodiment will be described with reference to the flowcharts of FIGS. 17 and 18.

Figure 17:
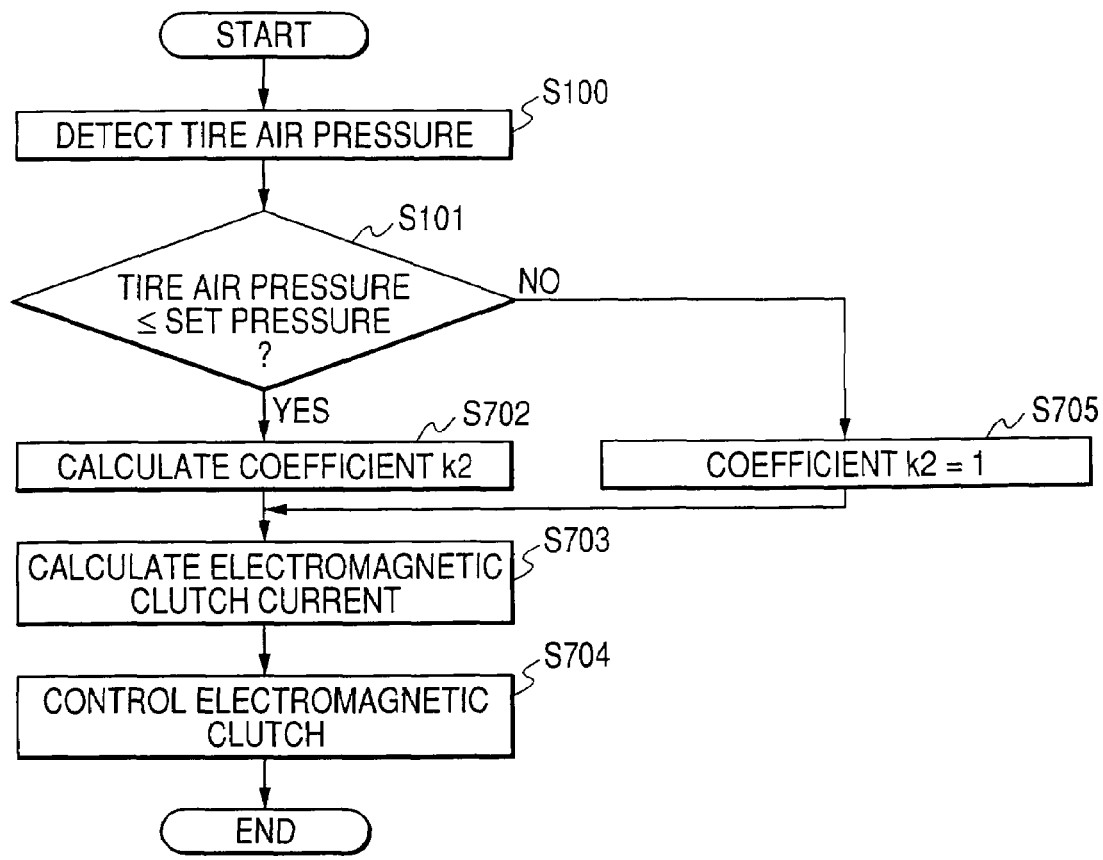
FIG. 17 is a flowchart showing the operation of the vehicle control device of FIG. 16.

In step S100 of FIG. 17, the tire air pressure signal detected by the tire air pressure detecting unit 13 is received. The detection of the tire air pressure may be carried out every fixed time interval or in accordance with a vehicle status such as a vehicle speed, a previous tire air pressure detection value or the like.

In the next step S101, the tire air pressure reduction judging unit 19 judges whether the tire air pressure is reduced to predetermined pressure or less. Here, if it is judged that the tire air pressure is over the predetermined pressure and thus it is not reduced to the predetermined pressure or less, the coefficient k2 is set to 1 in step S705, and then the processing goes to an electromagnetic clutch current calculating step S703. Here, k2=1 is a coefficient under normal state.

Figure 19:
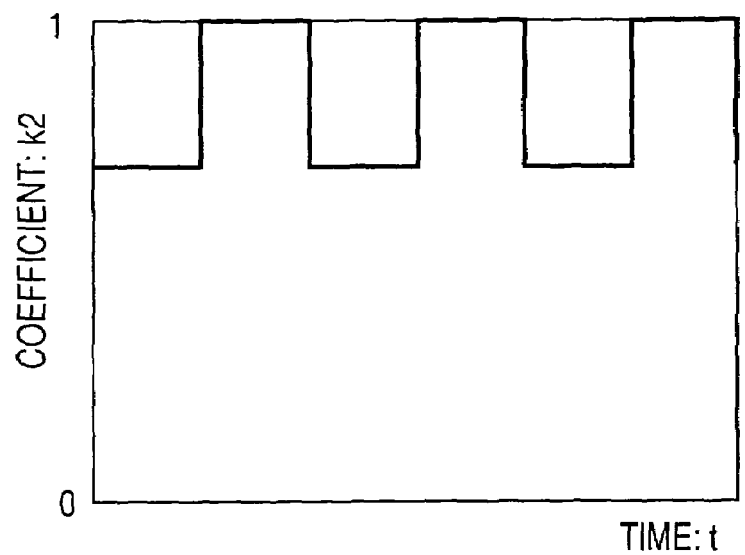
FIG. 19 is a graph showing a time variation example of a coefficient k2 of electromagnetic clutch current of the flow of FIG. 17.

On the other hand, if it is judged that the tire air pressure is reduced to the predetermined pressure or less, the coefficient k2 is determined in step S702, and then the process goes to the electromagnetic clutch current calculating step S703. Here, FIG. 19 shows an example of the coefficient k2. FIG. 19 shows that the coefficient k2 repeats a reduced state (k2<1) and a normal state (k2=1) every predetermined time (for example, one to several seconds). By using the coefficient k2 thus calculated, the electromagnetic clutch current is calculated in step S703, and the electromagnetic clutch 26 is controlled in the next step S704.

Figure 18:
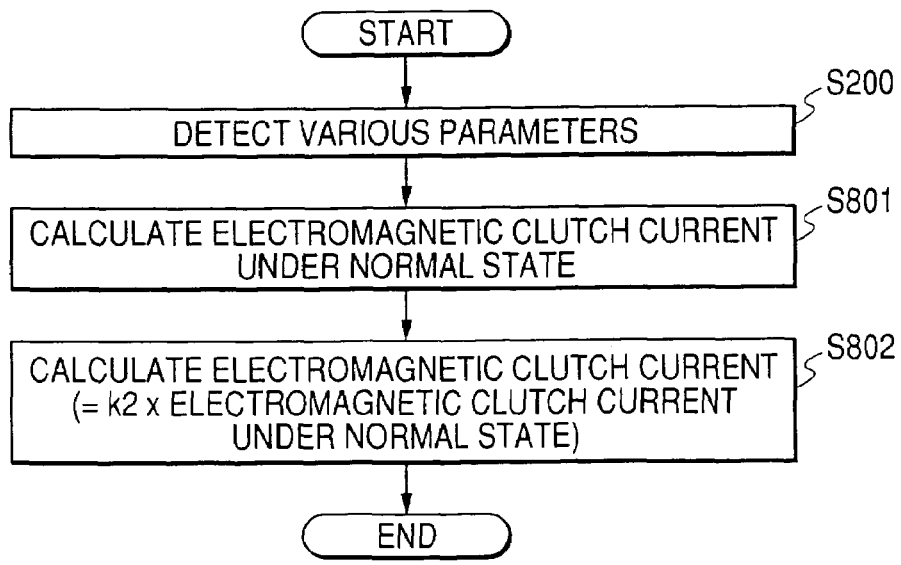
FIG. 18 is a flowchart showing the details of a part of the flow of FIG. 17.

FIG. 18 shows an example of the electromagnetic clutch current calculating step S703. First, the various parameter signals are received from the various-parameters detecting unit 16. Subsequently, in a normal-state electromagnetic clutch current calculating step S801, electromagnetic clutch current under normal state is calculated from these parameters. In the next step S802, the electromagnetic clutch current is calculated by using the equation (4).

If it is judged that the tire air pressure is reduced to the predetermined pressure or less, from the equation (4) and FIG. 19, the electromagnetic clutch current alternately repeats an electromagnetic clutch current reduced state and a normal state. Under the reduced state, the current value is small to the extent that the clutch slides, so that the clutch press-fit force increases/decreases time-dependently, and the transmission rate from the engine to the driving system increases/decreases. Even when the driver operates to drive the vehicle at a fixed speed, the vehicle driving force increases/decreases and thus the engine rotational speed is not fixed. Therefore, the driver has an uncomfortable feeling and thus recognizes abnormality, so that the driver can drive the vehicle with keeping safety.

Here, the increasing and decreasing function of the electromagnetic clutch current is not limited to the content of the above embodiment, and it may be varied like a sine wave, a triangular wave or the like.

In this embodiment, the electromagnetic clutch is used as the clutch, however, the clutch is not limited to the electromagnetic clutch. For example, any clutch type may be used insofar as it is a clutch mechanism for disconnecting/connecting the engine and the driving system from/to each other and the control unit 14 can control the clutch press-fit force of the clutch.

Furthermore, by simultaneously increasing/decreasing some or all of the engine control amount, the transmission change gear ratio and the clutch press-fit force of the transmission, the increasing/decreasing variation amount of the vehicle driving force can be more magnified in comparison with a case where any one of them is increased/reduced alone. Accordingly, even when the engine rotational speed is greatly increased/reduced during travel of the vehicle on a bad road and thus it seems that the driver hardly perceives some degree of variation in engine rotational speed, the driver can be surely made to perceive the variation.

Fifth Embodiment

In the vehicle control device described in any one of the first to fourth embodiments, at least one of the varying functions to control the engine control amount (air-fuel ratio, ignition timing), the change gear ratio of the transmission and the clutch press-fit force may be changed in accordance with the vehicle speed.

It is risky that the vehicle runs at high speed when the tire air pressure is reduced. However, in some cases, it is safer to drive the vehicle till the next parking area or the like at low speed than to stop the vehicle immediately on an express highway when the vehicle is traveling on the express highway. Accordingly, the increasing/decreasing amplitude (magnification of variation) is reduced when the vehicle travels at low speed, whereby the driver is enabled to move the vehicle till a safe place while he/she is made to recognize abnormality at all times. On the other hand, when the vehicle travels at high speed, the increasing/decreasing amplitude is increased, whereby the vehicle behavior variation is large and thus it is made difficult to drive the vehicle. This switching operation of the magnification of the variation can more enhance the safety.

Figure 20:
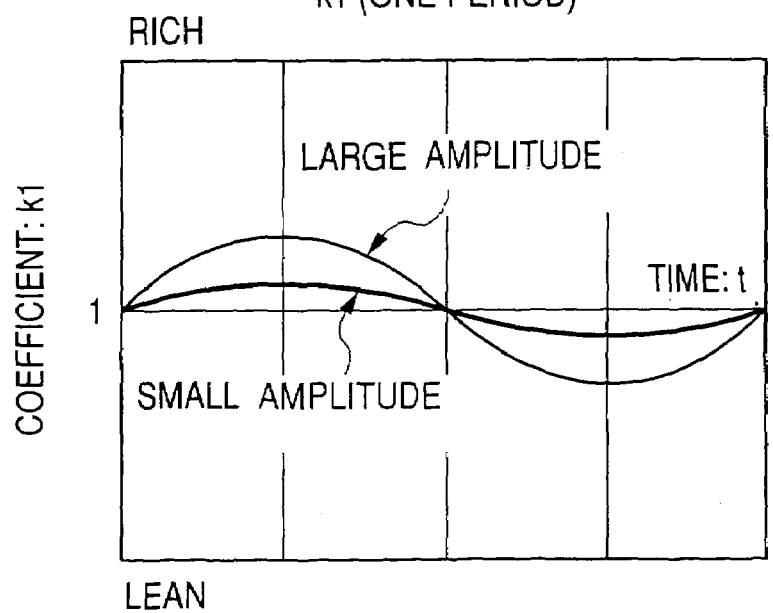
FIG. 20 is a graph showing a variation example of a coefficient k1 of fuel injection according to a fifth embodiment.
Figure 21:
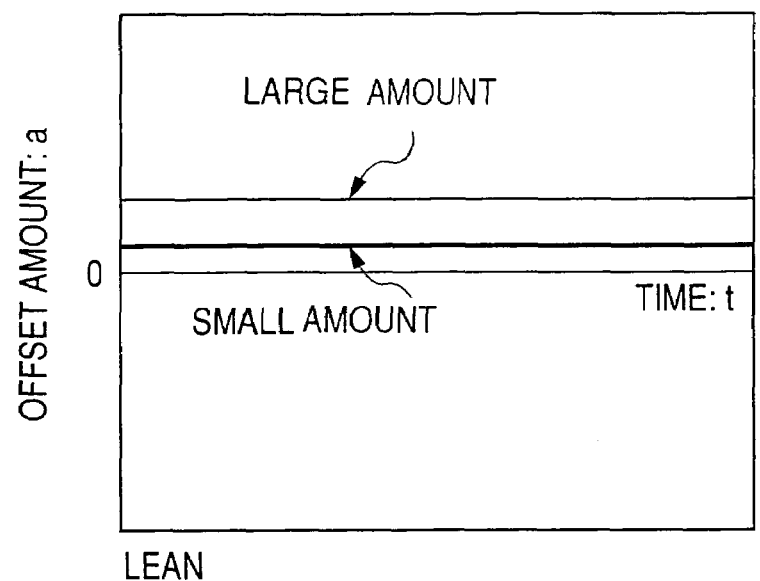
FIG. 21 is a graph showing a variation example of an offset amount "a" of a fuel injection amount according to the fifth embodiment.
Figure 22:
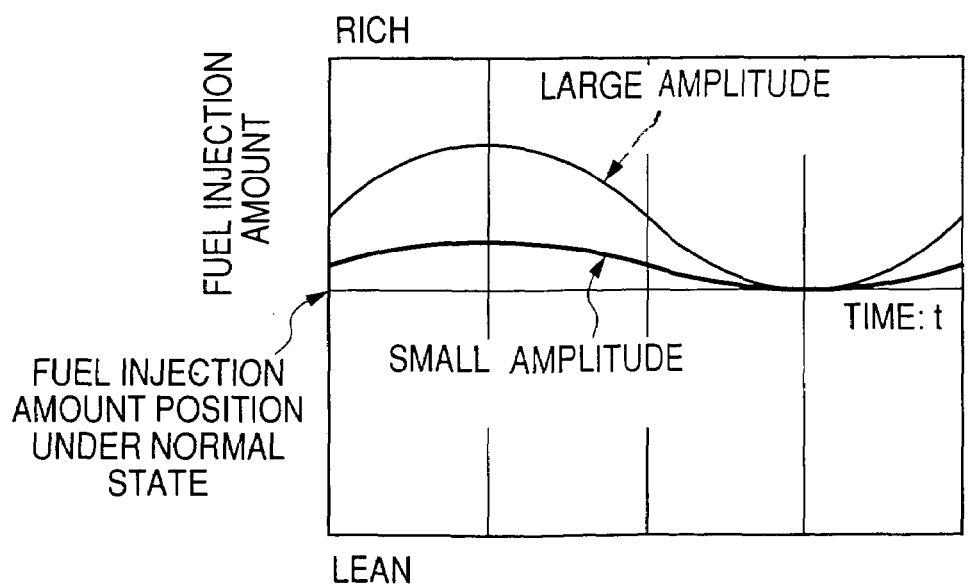
FIG. 22 is a graph showing a variation example of the fuel injection amount of the fifth embodiment.

FIGS. 20 to 22 show a case where the fuel injection amount is varied in two stages in accordance with a case where the vehicle speed is high or low (for example, the high vehicle speed is defined as a vehicle speed above 50 km/h, and the low vehicle speed is defined as a vehicle speed less than 50 km/h) in the control of increasing/decreasing the fuel injection amount of the first embodiment. If the fuel injection amount is set to be increased/reduced by a small amount like a smaller amplitude waveform of FIGS. 20-22 when the vehicle speed is low, the air-fuel ratio is increased/reduced by a small amount. Accordingly, the variation of the engine output is reduced, and thus the driver can move the vehicle to a safe place while recognizing an abnormal state at all times, exchange a blowout tire or the like. On the other hand, if the fuel injection amount is set to be increased/reduced by a large amount like a large amplitude waveform of FIGS. 20-22 when the vehicle speed is high, the displacement of the air-fuel ratio is increased, and the engine output is greatly varied. Therefore, the driver has a strongly uncomfortable feeling and thus cannot keep driving of the vehicle at high speed, whereby the safety can be enhanced. The above control is executed by a means linked to the vehicle speed (not shown) installed in the control unit 14.

Sixth Embodiment

In the vehicle control device described in any one of the first to fourth embodiments, at least one of the respective varying functions to control the engine control amount (air-fuel ratio, ignition timing), the change gear ratio of the transmission and the clutch press-fit force of the transmission may be changed in accordance with the rotational speed of the engine.

Figure 23:
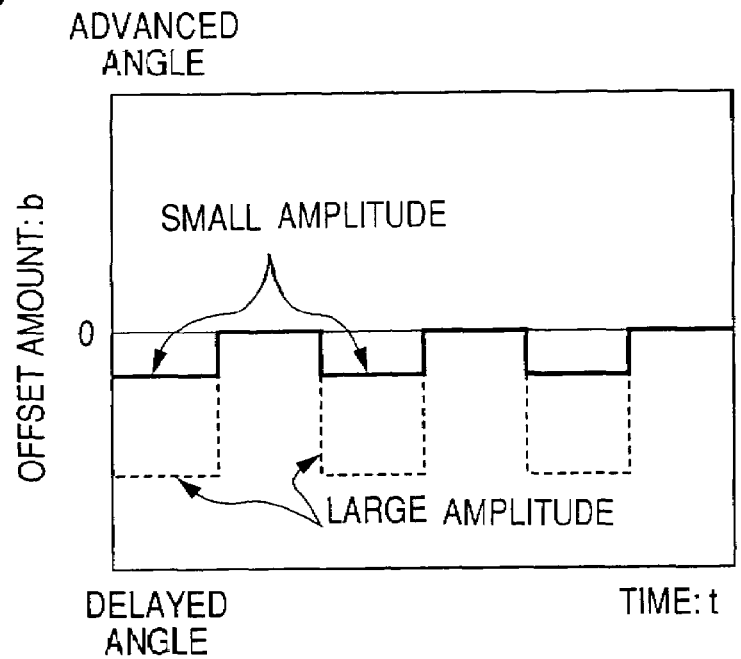
FIG. 23 is a graph representing a variation example of an offset amount "b" of ignition timing of a sixth embodiment.

FIG. 23 shows a case where the ignition timing is varied in two stages in accordance with a case where the engine rotational speed is above a predetermined rotational speed or less than the predetermined rotational speed (the predetermined rotational speed is set to 2500 r/m for general gasoline engine, for example) in the method of shifting the ignition timing to the advance side or delay side according to the second embodiment. If the ignition timing is set to be advanced/delayed by a small amount like a smaller amplitude waveform of FIG. 23 when the engine rotational speed is less than the predetermined rotational speed, the variation of the engine output is small, and thus the driver can move the vehicle to a safe place while recognizing an abnormal state at all times and exchange a blowout tire or the like. On the other hand, if the ignition timing is advanced/delayed by a large amount like a larger amplitude waveform of FIG. 23 when the engine rotational speed is above the predetermined rotational speed, the variation of the engine output is large, and thus the driver cannot keep the high rotational speed of the engine, whereby the safety can be enhanced. The above control is executed by a means linked to the engine rotational speed (not shown) installed in the control unit 14.

Seventh Embodiment

In the vehicle control device described in any one of the first to fourth embodiments, at least one of the respective varying functions to control the engine control amount (air-fuel ratio, ignition timing), the change gear ratio of the transmission and the clutch press-fit force of the transmission may be changed in accordance with the change gear ratio of the transmission.

When the change gear ratio of the transmission is a low-speed side change gear ratio, the vehicle speed is not so high. On the other hand, when the change gear ratio of the transmission is a high-speed side change gear ratio, the vehicle speed is high, and thus it is risky to drive the vehicle while the air pressure of a tire is reduced.

Figure 24:
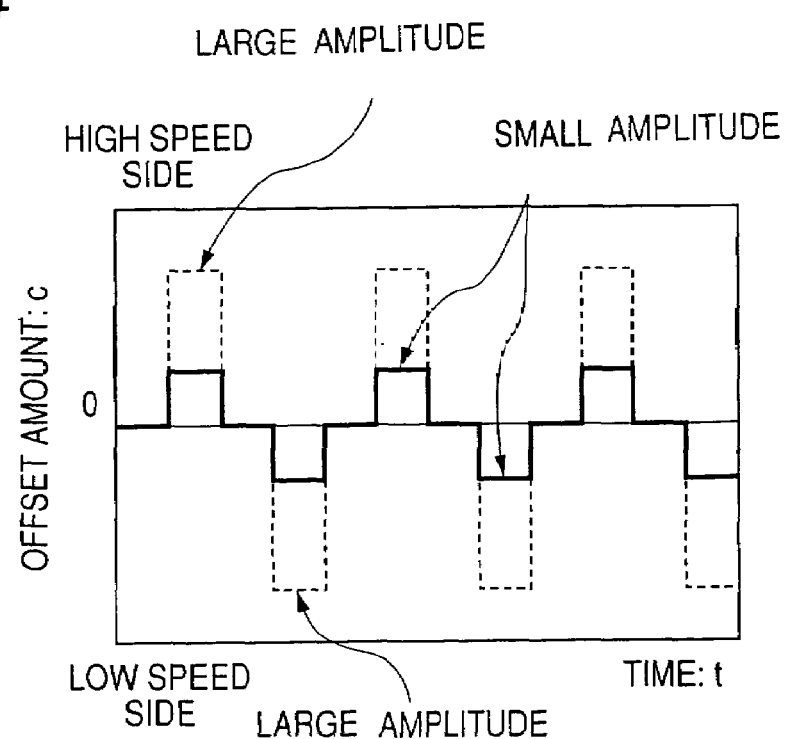
FIG. 24 is a graph showing a variation example of an offset amount "c" of a change gear ratio according to a seventh embodiment.

FIG. 24 shows a case where an offset amount "c" is varied in two stages in accordance with a case where the change gear ratio is set to a low-speed side or a high-speed side (for example, in the case of a five-stage transmission, the second or less stages are defined as the low-speed side, and the third or more stages are defined at the high-speed side) in the method of carrying out the increasing/decreasing control on the transmission change gear ratio described in the third embodiment. If the change gear ratio is set to be increased/decreases by a small amount like a smaller amplitude waveform of FIG. 24 when the change gear ratio is set at the low-speed side, the effect on the vehicle behavior is small. Therefore, the driver can move the vehicle to a safe place while recognizing an abnormal state at all times, and exchange a blowout tire or the like. On the other hand, the change gear ratio is set to be increased/reduced by a large amount like a larger amplitude waveform of FIG. 24 when the change gear ratio is set at the high-speed side, the vehicle behavior is greatly varied, so that the driver cannot keep the high-speed traveling of the vehicle and thus the safety can be enhanced.

In this embodiment, it is preferable that the change gear ratio of the transmission can be controlled steplessly like CVT. However, the above object can be satisfied if in a 5-stage automatic transmission (AT), the change gear ratio is periodically shifted between the first and second stages after reduction in tire air pressure is detected when the automatic transmission is set to a first or second stage under normal state, and the change gear ratio is periodically shifted among the third to fifth stages after reduction of tire air pressure is detected when the automatic transmission is set to any one of the third to fifth stages. The above control is executed by a means linked to the change gear ratio (not shown) installed in the control unit 14.

Eight Embodiment

In the vehicle control device described in any one of the first to fourth embodiments, at least one of the respective varying functions to control the engine control amount (air-fuel ratio, ignition timing), the change gear ratio of the transmission and the clutch press-fit force of the transmission may be changed in accordance with the tire air pressure.

When reduction of tire air pressure is detected, various kinds of statues may be estimated. For example, it may be considered that the tire air pressure is reduced to less than proper pressure not by blowout, but by insufficient adjustment of tires. In this case, if the varying function is varied in accordance with a displacement amount from the proper pressure, the driver can be made to recognize how degree the tire air pressure is displaced from the proper pressure. Accordingly, the driver is encouraged to adjust the tire air pressure and actually the driver adjusts the tire air pressure, so that fuel mileage can be enhanced and safety of the vehicle can be enhanced.

Figure 25:
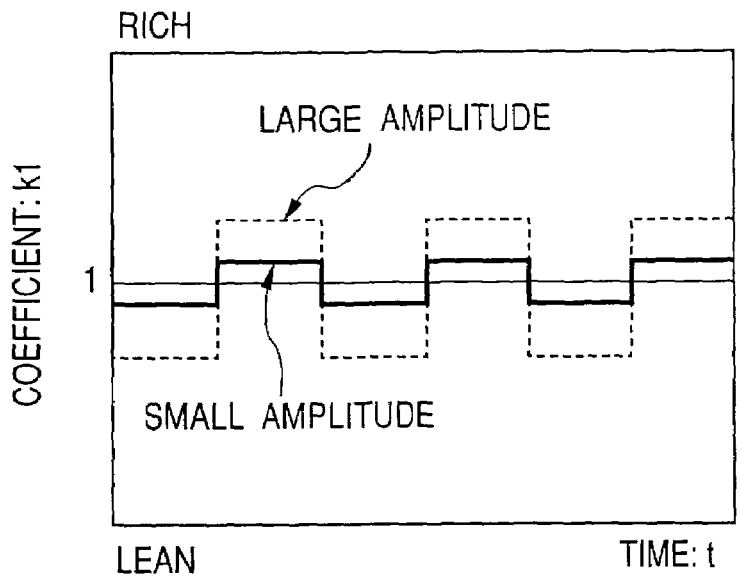
FIG. 25 is a graph showing a variation example of a coefficient k1 of a fuel injection amount according to an eighth embodiment.
Figure 26:
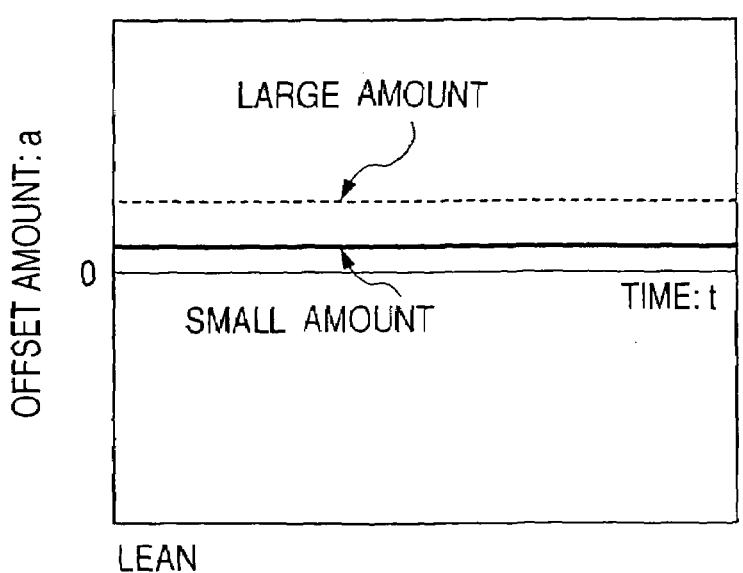
FIG. 26 is a graph showing a variation example of an offset amount "a" of a fuel injection amount according to the eighth embodiment.
Figure 27:
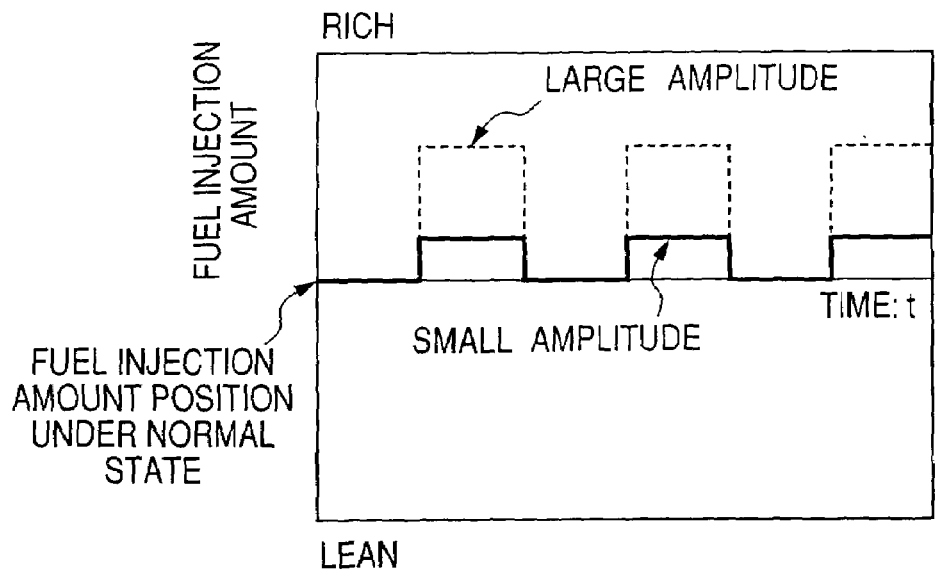
FIG. 27 is a graph showing a variation example of the fuel injection amount of the eighth embodiment.

FIGS. 25 to 27 show a case where the fuel injection amount is varied in two stages in accordance with a case where a displacement amount of tire air pressure from predetermined pressure is less than a predetermined value or above the predetermined value (the predetermined value is set to 30% reduction of proper tire pressure (value described in catalogues), for example). If the fuel injection amount is set to be increased/reduced by a small amount like a smaller amplitude waveform of FIGS. 25 to 27 when the displacement amount of the tire air pressure from the predetermined pressure is less than the predetermined value, the air-fuel ratio is increased/reduced by only a small amount. Accordingly, the variation of the engine output is small, and the driver can move the vehicle to a safe place while recognizing an abnormal state at all times and adjust the tire air pressure or the like. On the other hand, if the fuel injection amount is set to be increased/reduced like a larger amplitude waveform of FIGS. 25 to 27 when the displacement amount of the tire air pressure from the predetermined pressure is above the predetermined value, the air-fuel ratio is greatly increased/reduced. Accordingly, the displacement of the air-fuel ratio is large, and the engine output is varied, so that the driver cannot keep high-speed driving, and thus the safety can be enhanced. The control is executed by a means linked to the air pressure (not shown) installed in the control unit 14.

Ninth Embodiment

In the vehicle control device described in any one of the first to fourth embodiments, at least one of the respective varying functions to control the engine control amount (air-fuel ratio, ignition timing), the change gear ratio of the transmission and the clutch press-fit force of the transmission may be changed in accordance with a travel distance of the vehicle from a position at which it is judged that the tire air pressure is reduced to predetermined pressure or less.

As described above, with respect to the run flat tires, the vehicle can travel within a predetermined distance at a predetermined vehicle speed or less (for example, vehicle speed of 80 km/h or less, travel distance of 80 km or less) even when the tire air pressure of a run flat tire is equal to zero. However, it is risky to drive the vehicle at the predetermined distance or more even when run flat tires are used.

As not shown, a vehicle is equipped with a travel distance measuring unit for integrating the travel distance after reduction of tire air pressure is detected.

Figure 28:
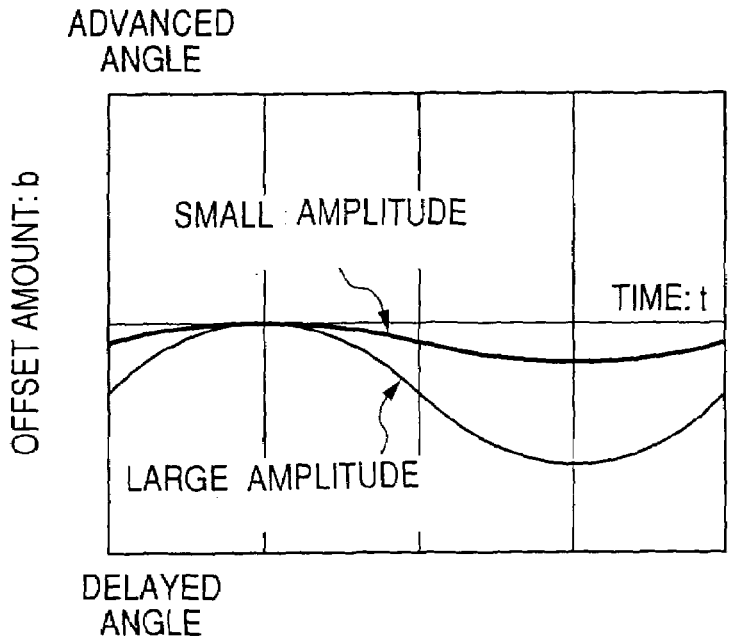
FIG. 28 is a graph showing a variation example of an offset amount "b" of ignition timing of a ninth embodiment.

FIG. 28 shows a case where the ignition timing is varied in two stages in accordance with a case where the travel distance after reduction of tire air pressure is detected is less than a predetermined distance or above the predetermined distance (the predetermined distance is a distance specified by each maker of run flat tires, and it is equal to 80 km, for example) in the method of controlling of advancement/delay of the ignition timing according to the second embodiment when run flat tires are used. If the ignition timing is set to be slightly advanced/delayed like a smaller amplitude waveform of FIG. 28 when the travel distance is less than the predetermined distance, the variation of the engine output is small, and thus the driver can move the vehicle to a safe place while recognizing an abnormality state at all times and exchange a blowout tire or the like. On the other hand, if the ignition timing is set to be greatly advanced/delayed like a larger amplitude waveform of FIG. 28 when the travel distance is above the predetermined distance, the variation of the engine output is large, and thus the driver cannot keep high-speed driving, so that the safety can be enhanced. The above control is executed by a means linked to the travel distance (not shown) installed in the control unit 14.

Tenth Embodiment

In the vehicle control device described in any one of the first to fourth embodiments, at least one of the respective varying functions to control the engine control amount (air-fuel ratio, ignition timing), the change gear ratio of the transmission and the clutch press-fit force of the transmission may be changed in accordance with tire performance.

There have been developed and sold so-called ran flat tires with which even when tire air pressure is equal to zero, the vehicle can travel safely at a predetermined vehicle speed or less within a predetermined distance (for example, vehicle speed of 80 km/h or less, travel distance of 80 km or less).

On the other hand, when normal tires which are generally used at present blow out, they burst up because they cannot support the weight of the vehicle. Therefore, it is risky to drive the vehicle at high speed (vehicle speed of 80 km/h or the like) when a tire blows out.

As not shown, the control unit 14 is equipped with a tire performance inputting unit for inputting a performance specification of tires as described above.

Figure 29:
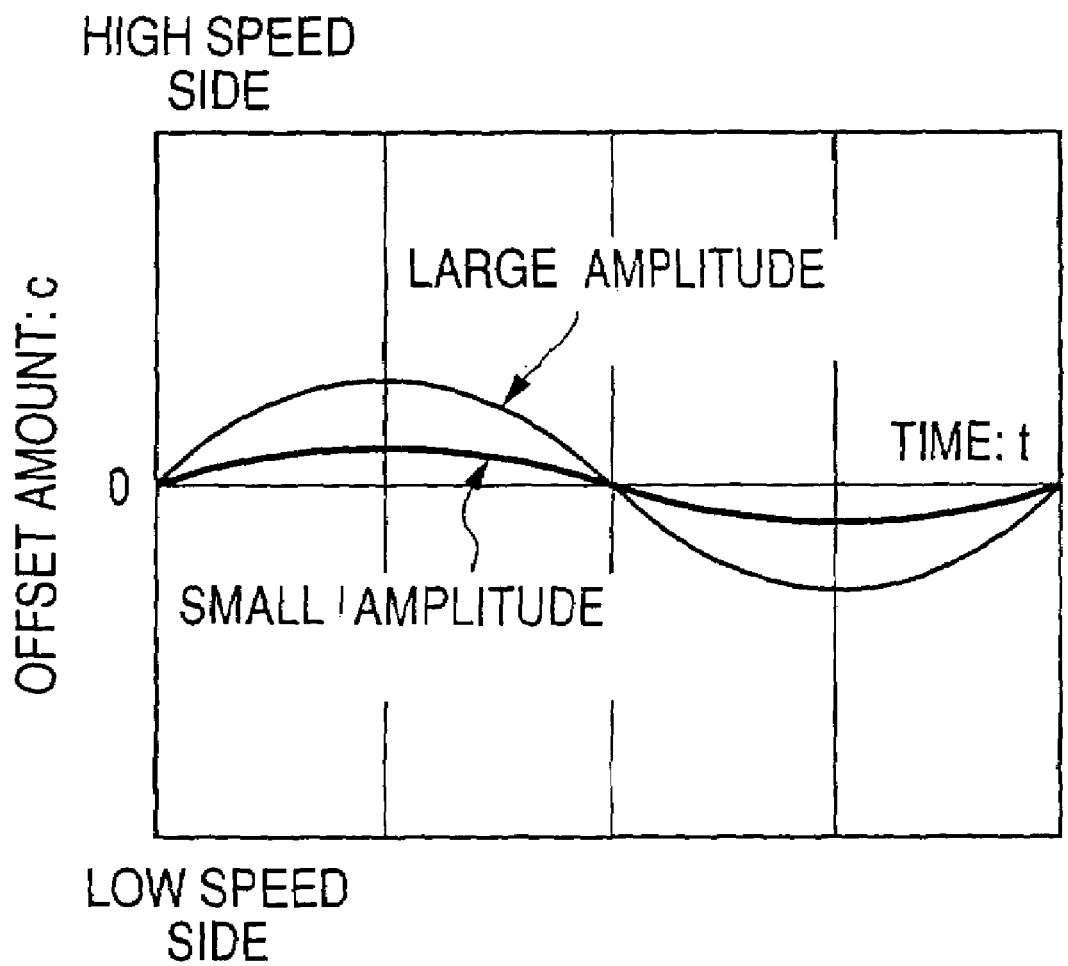
FIG. 29 is a graph showing a variation example of an offset amount "c" of a change gear ratio according to a tenth embodiment.

FIG. 29 shows a case where the change gear ratio of the transmission is varied in two stages in accordance with a case where run flat tires are used or general tires are used in the method of increasing/decreasing the transmission change gear ratio of the third embodiment. If the change gear ratio is set to be increased/reduced like a smaller amplitude waveform of FIG. 29 when blowout occurs in the run flat tires, the variation of the rotational speed of the engine is small, and thus the driver can move the vehicle to a safe place while recognizing an abnormality state at all times and exchange a blowout tire. On the other hand, if the change gear ratio is set to be increased/reduced like a larger amplitude waveform of FIG. 29 when blow-out occurs in the normal tires, the variation of the engine output is large, and thus the driver cannot keep high-speed driving, so that the safety can be enhanced. The above control is carried out by a means linked to the tire performance (not shown) installed in the control unit 14.

What is claimed is:

1. A vehicle control device comprising:
   a tire air pressure detecting unit for detecting air pressure of a tire equipped to a vehicle having an engine mounted therein and outputting a tire air pressure signal;
   a tire air pressure reduction judging unit for judging on the basis of the tire air pressure signal whether tire air pressure is reduced to predetermined pressure or less; and
   an output varying unit for periodically varying driving force of the engine to the tire according to a predetermined varying function on the basis of the judgement result.

2. The vehicle control device according to claim 1, wherein the engine is an internal combustion engine, and the output varying unit is equipped with an air-fuel ratio control unit for varying a fuel supply amount or air supply amount to the internal combustion engine according to the predetermined varying function.

3. The vehicle control device according to claim 1, wherein the engine is an electrical spark ignition type engine, and the output varying unit is equipped with an ignition timing control unit for varying an ignition timing of the electrical spark ignition type engine according to the predetermined varying function.

4. The vehicle control device according to claim 1, wherein the engine is equipped with a transmission for transmitting a rotational speed of an output shaft of the engine to the tire with increasing/reducing the rotational speed, and the output varying unit is equipped with a change gear ratio control unit for varying a change gear ratio of the transmission according to the predetermined varying function.

5. The vehicle control device according to claim 1, wherein the engine is equipped with a clutch for controlling connection/disconnection of rotational transmission of the output shaft from the engine to the tire, and the output varying unit is equipped with a clutch control unit for varying press-fit force of the clutch according to the predetermined varying function.

6. The vehicle control device according to claim 1, wherein the output varying unit is equipped two or more of a fuel-air ratio control unit, an ignition timing control unit, a change gear ratio control unit and a clutch control unit.

7. The vehicle control device according to claim 1, further comprising:
- a speed detecting unit for detecting a travel speed of the vehicle; and
- a vehicle speed linking unit for changing the predetermined varying function in accordance with the vehicle speed.

8. The vehicle control device according to claim 1, further comprising:
- an engine rotational speed detecting unit for detecting the rotational speed of the engine; and
- an engine rotational speed linking unit for changing the predetermined varying function in accordance with the rotational speed of the engine.

9. The vehicle control device according to claim 1, wherein the engine is equipped with a transmission for transmitting a rotational speed of an output shaft of the engine to the tire with increasing/reducing the rotational speed, a change gear ratio detecting unit for detecting a change gear ratio of the transmission, and a change gear ratio linking unit for changing the predetermined varying function according to the change gear ratio.

10. The vehicle control device according to claim 1, further comprising a tire air pressure linking unit for changing the predetermined varying function on the basis of the air pressure of the tire.

11. The vehicle control device according to claim 1, further comprising;
- a travel distance measuring unit for measuring a travel distance of the vehicle after the tire air pressure reduction judging unit judges reduction of the tire air pressure,
- and a travel distance linking unit for changing the predetermined varying function on the basis of the travel distance.

12. The vehicle control device according to claim 1, further comprising;
- a tire performance inputting unit for inputting at least one of a specification, performance and a model number of the tire, and
- a tire performance linking unit for changing the predetermined varying function on the basis of information input by the tire performance inputting unit.

13. The vehicle control device according to claim 1, further comprising a check input unit which is equipped around a driver's seat of the vehicle, and outputs an instruction for changing the predetermined varying function to the output varying unit for only a predetermined time when the output varying unit varies the output according to the predetermined varying function.

* * * * *